(12) United States Patent
Chang et al.

(10) Patent No.: US 8,077,627 B2
(45) Date of Patent: Dec. 13, 2011

(54) RECEIVING APPARATUS AND METHOD IN BROADBAND WIRELESS ACCESS SYSTEM

(75) Inventors: Chung-Ryul Chang, Yongin-si (KR); Keun-Chul Hwang, Seongnam-si (KR); June Moon, Seoul (KR); Sung-Ho Lee, Seoul (KR); In-Seok Hwang, Seoul (KR); Sung-Woo Park, Suwon-si (KR); Jang-Hoon Yang, Sungnam-si (KR)

(73) Assignee: Samsung Electronics Co., Ltd (KR)

( * ) Notice: Subject to any disclaimer, the term of this patent is extended or adjusted under 35 U.S.C. 154(b) by 1106 days.

(21) Appl. No.: 11/846,295

(22) Filed: Aug. 28, 2007

(65) Prior Publication Data

US 2008/0051095 A1 Feb. 28, 2008

(30) Foreign Application Priority Data

Aug. 28, 2006 (KR) .................. 10-2006-0081780
Sep. 21, 2006 (KR) .................. 10-2006-0091543
Sep. 21, 2006 (KR) .................. 10-2006-0091545

(51) Int. Cl.
*H04B 7/02* (2006.01)
(52) U.S. Cl. ......... 370/252; 455/135; 375/148; 375/347
(58) Field of Classification Search .................. 370/208, 370/252; 375/148, 347; 455/135
See application file for complete search history.

(56) References Cited

U.S. PATENT DOCUMENTS

| | | | | |
|---|---|---|---|---|
| 2002/0061051 A1* | 5/2002 | Kitahara | ............... | 375/144 |
| 2005/0215218 A1* | 9/2005 | Bottomley et al. | ........ | 455/226.1 |
| 2005/0286406 A1* | 12/2005 | Jeon et al. | ............... | 370/208 |
| 2006/0067385 A1* | 3/2006 | Kawaguchi | ............... | 375/148 |
| 2006/0223476 A1* | 10/2006 | Song et al. | ............... | 455/277.2 |
| 2006/0245510 A1* | 11/2006 | Oketani | ............... | 375/260 |
| 2006/0280262 A1* | 12/2006 | Malladi | ............... | 375/299 |
| 2007/0189363 A1* | 8/2007 | Eriksson et al. | ........... | 375/148 |

FOREIGN PATENT DOCUMENTS

| | | |
|---|---|---|
| JP | 2000-341239 | 12/2000 |
| JP | 2003-143111 | 5/2003 |
| JP | 2004-080360 | 3/2004 |
| JP | 2006-054603 | 2/2006 |

(Continued)

OTHER PUBLICATIONS

Leinonen et al.: "Performance of MMSE Detection in Cellular MC-CDMA with Layered Space-Frequency Coding", 2005 IEEE 16th International Symposium on Personal, Indoor and Mobile Radio Communications, Sep. 11, 2005.

(Continued)

*Primary Examiner* — Chirag Shah
*Assistant Examiner* — Jay P Patel
(74) *Attorney, Agent, or Firm* — The Farrell Law Firm, P.C.

(57) ABSTRACT

Provided is an apparatus and method for enhancing a demodulation performance of a receiver in a Broadband Wireless Access (BWA) system. A receiving apparatus in a broadband wireless communication system includes an estimator, a first calculator, and a second calculator. The estimator estimates a desired signal. The first calculator calculates a correlation matrix of a signal obtained by eliminating the estimated desired signal from a Received (RX) signal. The second calculator performs an interference elimination using the correlation matrix.

42 Claims, 14 Drawing Sheets

FOREIGN PATENT DOCUMENTS

| | | |
|---|---|---|
| JP | 2007-129697 | 5/2007 |
| JP | 2007-529176 | 10/2007 |
| JP | 2007-306532 | 11/2007 |
| KR | 102002001832 | 3/2002 |
| KR | 102006009796 | 9/2006 |
| KR | 102007009322 | 9/2007 |
| WO | WO 2005/067239 | 7/2005 |
| WO | WO 2005/096517 | 10/2005 |
| WO | WO 2006/070756 | 7/2006 |

OTHER PUBLICATIONS

Li et al.: "Adaptive Antenna Arrays for OFDM Systems with Cochannel Interference", IEEE Transactions on Communications, Feb. 1, 1999.

Baltersee: "On the Capacity of Multiple-Input Multiple-Output Wireless Systems with Data-Aided Channel Estimation Passage", Jan. 1, 2002.

McBeath et al.: "Impact of Imperfect Estimators on W-CDMA Receiver Performance with MIMO Antenna Systems", 2003 IEEE 58th Vehicular Technology Conference, Oct. 6, 2003.

Salzer et al.: "Comparison of Antenna Array Techniques for the Downlink of Multi-Carrier CDMA Systems", 57th IEEE Semiannual Vehicular Technology Conference, Apr. 22, 2003.

Bengtsson et al.: "System Comparison of Smart and Dumb Antennas", 2005 IEEE 61st Vehicular Technology Conference, May 30, 2005.

\* cited by examiner

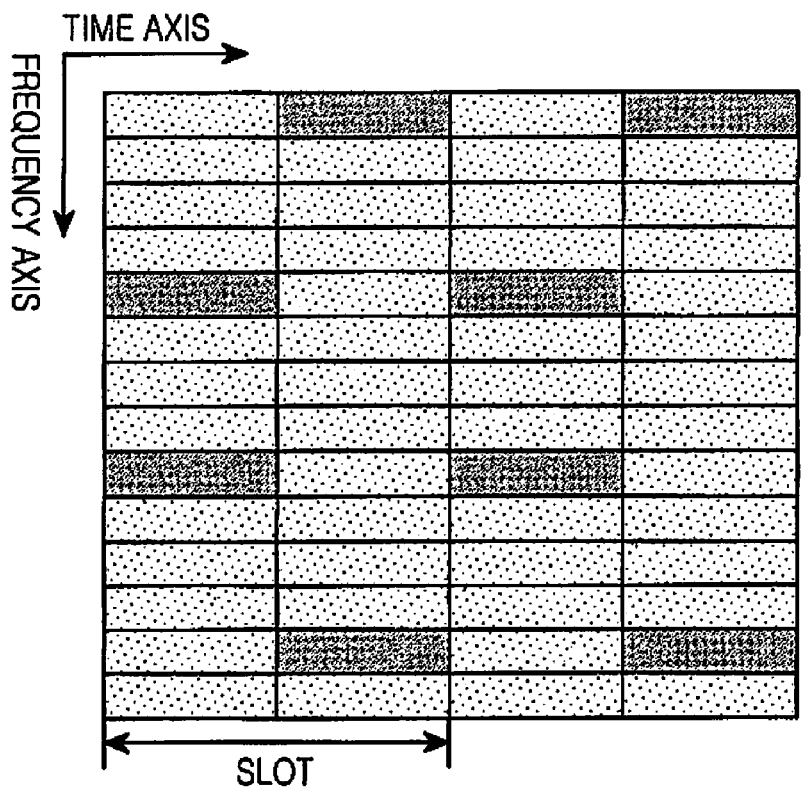
FIG. 12A 2-SLOT PUSC SUBCHANNEL
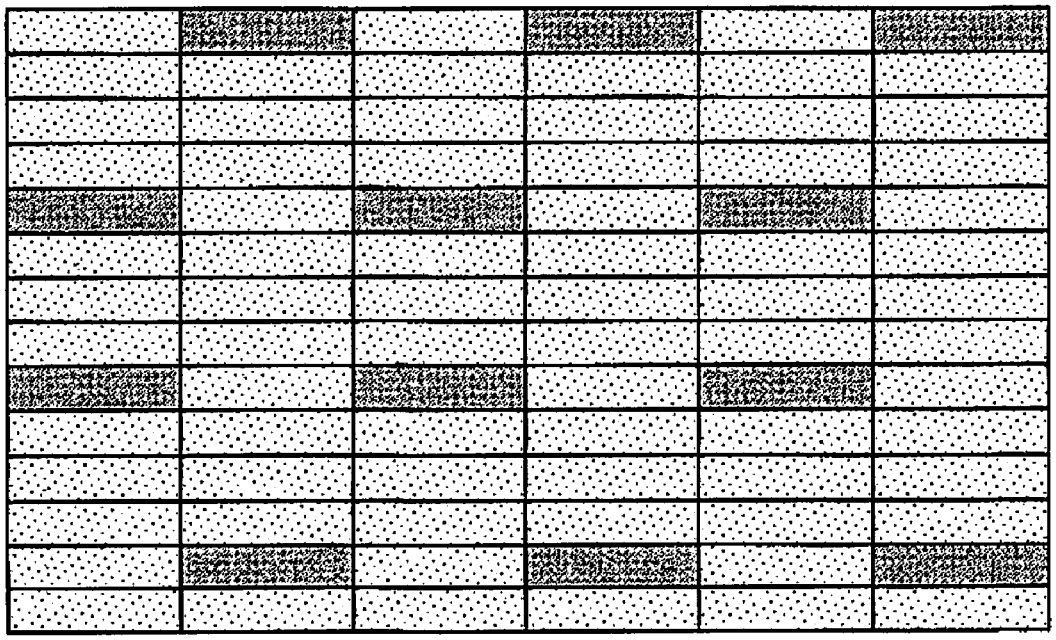
FIG. 12B 3-SLOT PUSC SUBCHANNEL

RECEIVING APPARATUS AND METHOD IN BROADBAND WIRELESS ACCESS SYSTEM

PRIORITY

This application claims priority under 35 U.S.C. §119(a) to an application filed in the Korean Intellectual Property Office on Aug. 28, 2006 and assigned Serial No. 2006-81780, an application filed in the Korean Intellectual Property Office on Sep. 21, 2006 and assigned Serial No. 2006-91543, and an application filed in the Korean Intellectual Property Office on Sep. 21, 2006 and assigned Serial No. 2006-91545, the contents of which are incorporated herein by reference.

BACKGROUND OF THE INVENTION

1. Field of the Invention

The present invention relates generally to a receiving apparatus and method in a Broadband Wireless Access (BWA) system, and in particular, to an apparatus and method for enhancing the demodulation performance of a receiver in a multi-cell BWA system.

2. Description of the Related Art

As generally known in the art, communication systems have been primarily developed for voice communication services, but the communications systems are also evolving to provide data services and various multimedia services. However, conventional communication systems, which are mainly directed to providing voice communication services, still have a narrow data transmission bandwidth and require a high subscription fee. For these reasons, the conventional communication systems cannot satisfy diversified user demands. Furthermore, in line with rapid development in the communication industry and ever-increasing demands on Internet services, it is important to provide communication systems capable of providing Internet services efficiently. As a result of these trends, BWA systems having a bandwidth large enough to both satisfy the increasing user demands and provide efficient Internet services have been proposed.

In addition to providing voice communication services, BWA systems also support a combination of various data services both at low and high speeds and multimedia application services (e.g., high-quality moving pictures). BWA systems are based on wireless media using a broadband of 2 GHz, 5 GHz, 26 GHz, or 60 GHz and are able to access a Public Switched Telephone Network (PSTN), a Public Switched Data Network (PSDN), an Internet network, an International Mobile Telecommunications-2000 (IMT-2000) network, and an Asynchronous Transfer Mode (ATM) network in a mobile or stationary environment, i.e., BWA systems are wireless communication systems capable of supporting a channel transmission rate of at least 2 Mbps. BWA systems may be classified into broadband wireless local loops, broadband mobile access networks, and high-speed wireless Local Area Networks (LANs) according to the terminal's mobility (stationary or mobile), communication environment (indoor or outdoor), and channel transmission rate.

The standardization of wireless access schemes of BWA systems is being conducted by the Institute of Electrical and Electronics Engineers (IEEE), particularly by the IEEE 802.16 standardization group, which is an international standardization organization.

IEEE 802.16 communication systems have a larger data transmission bandwidth than conventional communication systems for voice communication services. Therefore, the IEEE 802.16 communications systems can transmit more data for a limited period of time and share all user channels (or resources) for efficient channel utilization. Since Quality of Service (QoS) features are guaranteed, users are provided with various services of different qualities based on the characteristics of services.

The IEEE 802.16 communication systems use an Orthogonal Frequency Division Multiplexing (OFDM)/Orthogonal Frequency Division Multiple Access (OFDMA) scheme for physical channels, i.e., the BWA systems use an OFDM/OFDMA scheme to transmit physical channel signals over subcarriers, thereby enabling high-speed data transmission.

The BWA systems support the mobility of a Mobile Station (MS) through a multi-cell structure and using the same frequency in all the cells for frequency utilization efficiency (spectral efficiency). The performance of such a multi-cell communication system is affected greatly by an inter-cell interference.

FIG. 1 is a schematic diagram of a multi-cell BWA system.

Referring to FIG. 1, a user terminal 110 in a cell-overlap region transmits an interference signal to a neighboring cell 120 in a multi-cell environment with a frequency reuse factor of 1. This interference signal affects a signal of another user terminal in the neighboring cell 120, degrading the demodulation performance. Thus, the inter-cell interference technique must be used in the multi-cell system.

FIG. 2 is a diagram illustrating an inter-cell interference in the multi-cell BWA system, which is shown on the frequency axis. As illustrated in FIG. 2, the inter-cell interference is modeled as a discontinuous narrowband signal in the frequency band.

It is known in the art that a better decoding performance can be provided when a hard-decision value of coded bits, instead of a soft-decision value, is provided to a channel decoder. The input soft-decision value of the decoder is an estimated value of a modulation symbol transmitted on a channel, which may be a Log Likelihood Ratio (LLR). A noise value of a corresponding frequency band is needed to calculate the LLR.

In the conventional art, the LLR is calculated using the average noise value of the entire band, which fails to consider an inter-cell interference with narrowband/discontinuous characteristics illustrated in FIG. 2. This degrades the demodulation performance of a receiver. Typically, noise estimation is performed by using subtraction between neighboring pilot signals (or symbols). Also, an average is taken over the entire band, thereby increasing the estimation accuracy. However, the estimated noise value for the entire band is unsuitable for an OFDM-based BWA system with narrowband interference. What is therefore required is a noise estimator capable of reflecting the narrowband/discontinuous noise characteristics accurately.

As described above, elimination of the multi-cell interference and accurate noise estimation are required in order to enhance the demodulation performance of a receiver in the BWA system.

SUMMARY OF THE INVENTION

An object of the present invention is to substantially solve at least the above problems and/or disadvantages and to provide at least the advantages below. Accordingly, an object of the present invention is to provide an apparatus and method for enhancing the demodulation performance of a receiver in a BWA system.

Another object of the present invention is to provide an apparatus and method for eliminating an inter-cell interference in a BWA system.

Still another object of the present invention is to provide an apparatus and method for reducing the calculation complexity of a Minimum Mean Square Error (MMSE) interference eliminator in a BWA system.

Still another object of the present invention is to provide an apparatus and method for calculating a filter coefficient in a BWA system by using a correlation matrix of an RX signal from which a desired signal is eliminated.

Still another object of the present invention is to provide an apparatus and method for estimating a narrowband noise in a BWA system.

Still another object of the present invention is to provide an apparatus and method for enhancing the performance of LLR estimation in a BWA system.

Still another object of the present invention is to provide an apparatus and method for reducing the calculation complexity of a noise estimator in a BWA system.

Still another object of the present invention is to provide an apparatus and method for calculating a noise in a BWA system by using a parameter calculated by an MMSE interference eliminator.

Still another object of the present invention is to provide an apparatus and method for eliminating a multi-cell interference from an uplink signal in a BWA system.

Still another object of the present invention is to provide an apparatus and method for eliminating a multi-cell interference from a downlink signal in a BWA system.

Still another object of the present invention is to provide an apparatus and method for eliminating a multi-cell interference from a received control channel signal in a BWA system.

According to one aspect of the present invention, a receiving apparatus in a broadband wireless communication system includes an estimator for estimating a desired signal; a first calculator for calculating a correlation matrix of a signal obtained by eliminating the estimated desired signal from a Received (RX) signal; and a second calculator for performing an interference elimination using the correlation matrix.

According to another aspect of the present invention, a receiving apparatus in a broadband wireless communication system includes an estimator for estimating a desired signal; a first calculator for calculating a correlation matrix of a signal obtained by eliminating the estimated desired signal from an RX signal; a second calculator for performing an interference elimination using the correlation matrix, and a noise estimator for estimating a narrowband noise using at least one of the correlation matrix and a coefficient of an interference elimination filter.

According to still another aspect of the present invention, a receiving apparatus in a broadband wireless communication system includes a first channel estimator for estimating a channel coefficient of a preamble signal; a second channel estimator for estimating a channel coefficient of a pilot signal received in a data field; and an interference eliminator for calculating a correlation matrix by autocorrelating a signal obtained by subtracting the channel coefficient of the preamble signal or the channel coefficient of the pilot signal from a predetermined tone of an RX signal, and performing an MMSE-based interference elimination on a data-tone RX signal using the calculated correlation matrix.

According to still another aspect of the present invention, a receiving method in a broadband wireless communication system includes estimating a desired signal; calculating a correlation matrix of a signal obtained by eliminating the estimated desired signal from an RX signal; and performing an interference elimination using the correlation matrix.

According to still another aspect of the present invention, a receiving method in a broadband wireless communication system includes estimating a desired signal; calculating a correlation matrix of a signal obtained by eliminating the estimated desired signal from an RX signal; performing an interference elimination using the correlation matrix; and estimating a narrowband noise using at least one of the correlation matrix and a coefficient of an interference elimination filter.

According to still another aspect of the present invention, a receiving method in a broadband wireless communication system includes estimating a channel coefficient of a preamble signal; estimating a channel coefficient of a pilot signal received in a data field; calculating a correlation matrix by autocorrelating a signal obtained by subtracting the channel coefficient of the preamble signal or the channel coefficient of the pilot signal from a predetermined tone of an RX signal; and performing an MMSE-based interference elimination on a data-tone RX signal using the calculated correlation matrix.

BRIEF DESCRIPTION OF THE DRAWINGS

The above and other objects, features and advantages of the present invention will become more apparent from the following detailed description when taken in conjunction with the accompanying drawings in which:

FIG. 12A is a diagram illustrating a 2-slot PUSC subchannel structure in the BWA system according to the present invention;

FIG. 12B is a diagram illustrating a 3-slot PUSC subchannel structure in the BWA system according to the present invention;

DETAILED DESCRIPTION OF THE PREFERRED EMBODIMENTS

Figure 1:
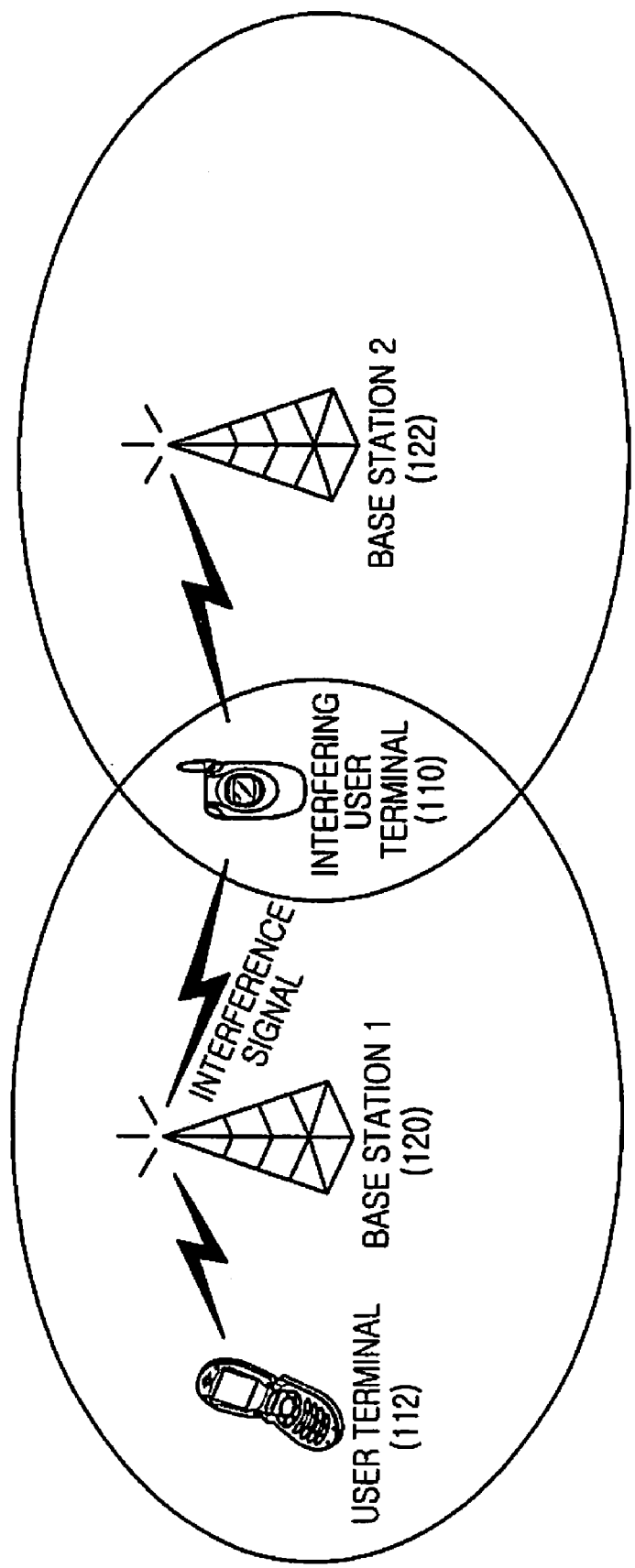
FIG. 1 is a schematic diagram of a multi-cell BWA system.
Figure 2:
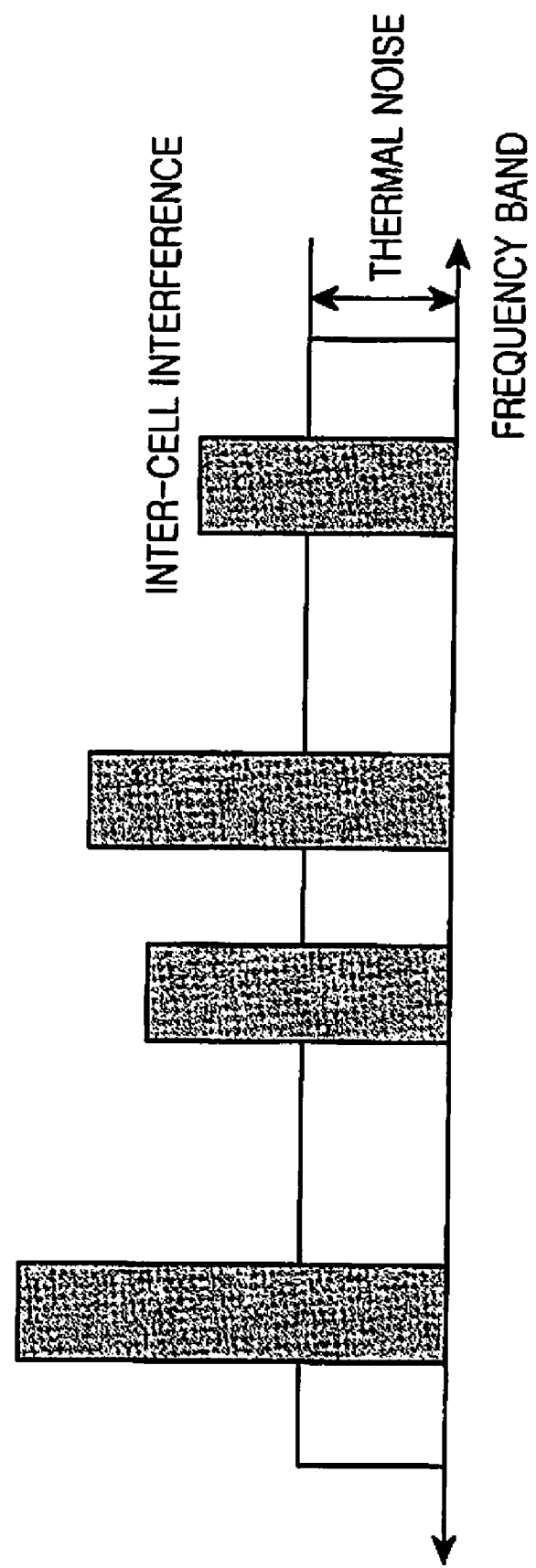
FIG. 2 is a diagram illustrating an inter-cell interference in the multi-cell BWA system, which is shown on the frequency axis.

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intention and usage. Therefore, the terms used herein must be understood based on the descriptions made herein.

The present invention provides a technique for eliminating a multi-cell interference in a BWA system. The present invention also provides a scheme for estimating a narrowband noise using a parameter calculated by an interference eliminator.

Although an Orthogonal Frequency Division Multiplexing (OFDM)-based Broadband Wireless Access (BWA) system is exemplified in the following description, the present invention can also be applied to any multi-cell communication system.

An interference elimination technique based on a general Minimum Mean Square Error (MMSE) scheme will be described first, prior to the description of the present invention.

The MMSE scheme can be expressed as Equation (1):

$$\hat{x} = WY$$

$$W = (H_D)^H R^{-1} \quad (1)$$

where Y denotes Received (RX) signals that are expressed as an ($N_R \times 1$) column vector if the number of RX antennas is $N_R$, W denotes the coefficients of an MMSE filter that are expressed as a ($1 \times N_R$) row vector if there is one signal to be demodulated, $\hat{x}$ denotes a Transmit (TX) signal that is estimated by the MMSE filter, $H_D$ denotes the radio channel characteristics of signals that are to be demodulated and are expressed as an ($N_R \times 1$) column vector, R denotes a correlation between RX signals that is expressed as an ($N_R \times N_R$) matrix, a superscript '$-1$' denotes an inverse matrix, and a superscript '$H$' denotes a Hermitian transpose.

The correlation matrix R in Equation (1) can be expressed as Equation (2):

$$R = E[YY^H] = E[(HX+N)(HX+N)^H] = HH^H + \sigma^2 I \quad (2)$$

where X denotes TX signals of all user terminals that are expressed as an ($N_U \times 1$) column vector if the number of all the user terminals is $N_U$, H denotes radio channels between the RX antennas and all the user terminals that are expressed as an ($N_R \times N_U$) matrix, N denotes the noises of the RX antennas that are expressed as an ($N_R \times 1$) column vector, $\sigma^2$ denotes noise poser, I denotes an ($N_R \times N_R$) identity matrix, and above subscript small H denotes a Hermitian matrix.

In the above MMSE scheme, not only the channel response (or a channel coefficient) of a desired user terminal but also the channel responses of other interfering user terminals must be estimated in order to construct the channel matrix H in Equation (2).

Thus, the present invention is intended to provide an MMSE interference eliminator that does not need the channel estimation of the interfering user terminal unlike the above MMSE scheme.

Figure 3:
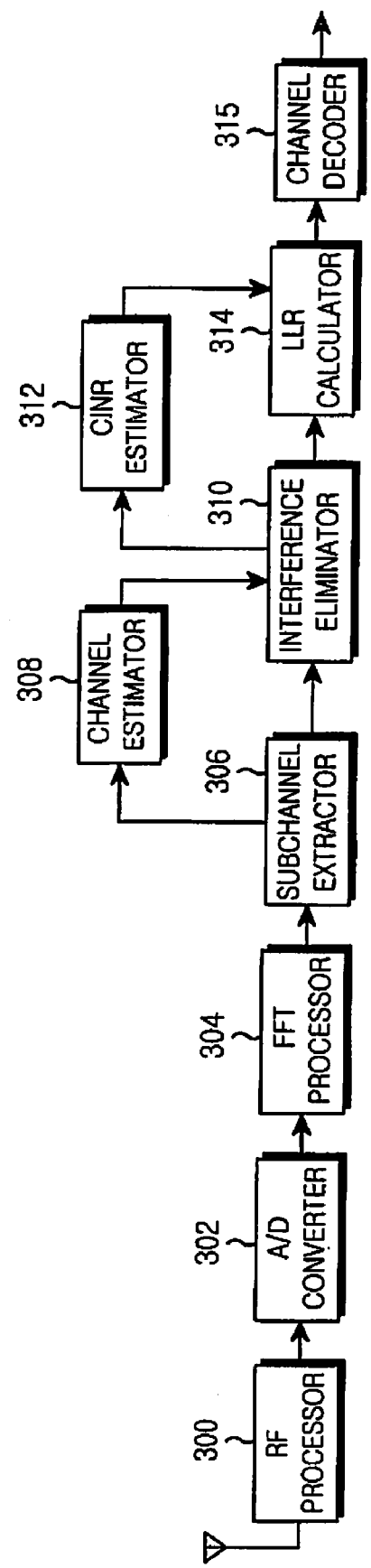
FIG. 3 is a block diagram of a receiver in a BWA system according to an embodiment of the present invention.

FIG. 3 is a block diagram of a receiver in a BWA system according to an embodiment of the present invention. The receiver may be a base station in the case of an UpLink (UL) transmission, and a user terminal in the case of a DownLink (DL) transmission.

Referring to FIG. 3, the receiver includes a Radio Frequency (RF) processor 300, an Analog-to-Digital (A/D) converter 302, a Fast Fourier transform (FFT) processor 304, a subchannel extractor 306, a channel estimator 308, an interference eliminator 310, a Carrier-to-Interference plus Noise Ratio (Carrier to Interference plus Noise Ratio (CINR)) estimator 312, an Log Likelihood Ratio (LLR) calculator 314, and a channel decoder 315. Although not illustrated in FIG. 3, the receiver is assumed to have multiple antennas.

The RF processor 300 includes a front-end unit and a filter. The RF processor 300 downconverts an RF signal received on a radio channel into a baseband signal. The A/D converter 302 converts the analog baseband signal received from the RF processor 300 into a digital signal (digital sample data).

The FFT processor 304 FFT-processes the time-domain sample data from the A/D converter 302 to output frequency-domain data. In accordance with a subchannel structure used, the subchannel extractor 306 discriminatively extracts a data signal and a pilot signal from the frequency-domain data received from the FFT processor 304. In the case of a subchannel structure illustrated in FIG. 5, the subchannel extractor 306 extracts 18 pilot signals per given unit (2 bins×9 symbols) and provides them to the channel estimator 308. The subchannel extractor 306 also provides the extracted data and pilot signals to the interference eliminator 310 discriminatively.

The channel estimator 308 estimates a channel coefficient of a desired signal using the pilot signals from the subchannel extractor 306. There are various methods for the channel estimation. For example, an interference effect can be minimized by averaging pilot tones. In this case, the average can be taken per bin along the frequency axis in consideration of the frequency selectivity of a radio channel. For the subchannel structure illustrated in FIG. 5, the estimated channel for each bin can be expressed as Equation (3):

$$\hat{H}_b = \frac{1}{9} \sum_{s=1}^{3} \sum_{p=1}^{3} H_{b,s,p} \quad (3)$$

$$\begin{cases} b: & \text{bin index, 1, 2} \\ s: & \text{slot index, 1, 2, 3} \\ p: & \text{pilot index, 1, 2, 3} \end{cases}$$

where $\hat{H}_b$ is an ($N_R \times 1$) column vector.

Besides the pilot signals, sounding signals or a variety of other methods may be used for the above channel estimation.

The interference eliminator 310 calculates a correlation matrix R using the channel coefficient from the channel estimator 308 and the pilot-tone RX signal from the subchannel extractor 306, and then calculates a coefficient W of an interference elimination filter using the correlation matrix R and the channel coefficient. The correlation matrix is calculated by autocorrelating a signal obtained by subtracting a desired signal (a channel coefficient) from an RX signal (a pilot-tone RX signal). The interference eliminator 310 sets the calculated coefficient in the interference elimination filter, and then filters the data signal from the subchannel extractor 306 using the interference elimination filter, thereby outputting the interference-free signal. The detailed structure of the interference eliminator 310 will be described later with reference to FIG. 6.

The CINR estimator 312 calculates a CINR (or a narrowband noise) using the correlation matrix R and the filter coefficient W received from the interference eliminator 310. In another embodiment, the CINR estimator 312 calculates a narrowband noise using the filter coefficient W from the interference eliminator 310 and the channel coefficient H from the channel estimator 308. The term "narrowband" is used to indicate that the calculated CINR corresponds not to the entire band but to a predetermined band (e.g., bins). The calculated CINR is used as a weight for application of reliability to a demodulation signal for LLR calculation. The detailed operation of the CINR estimator 312 will be described later with reference to the following Equations.

The LLR calculator 314 demodulates the interference-free signal from the interference eliminator 310 to generate an LLR, and applies a weight (reliability) of the CINR to the LLR, i.e., using the narrowband noise from the CINR estimator 312, the LLR calculator 314 demodulates the interference-free signal to generate an LLR. The channel decoder 315 soft-decision decodes the LLRs from the LLR calculator 314 to recover an information bit stream transmitted from a transmitter.

Figure 4:
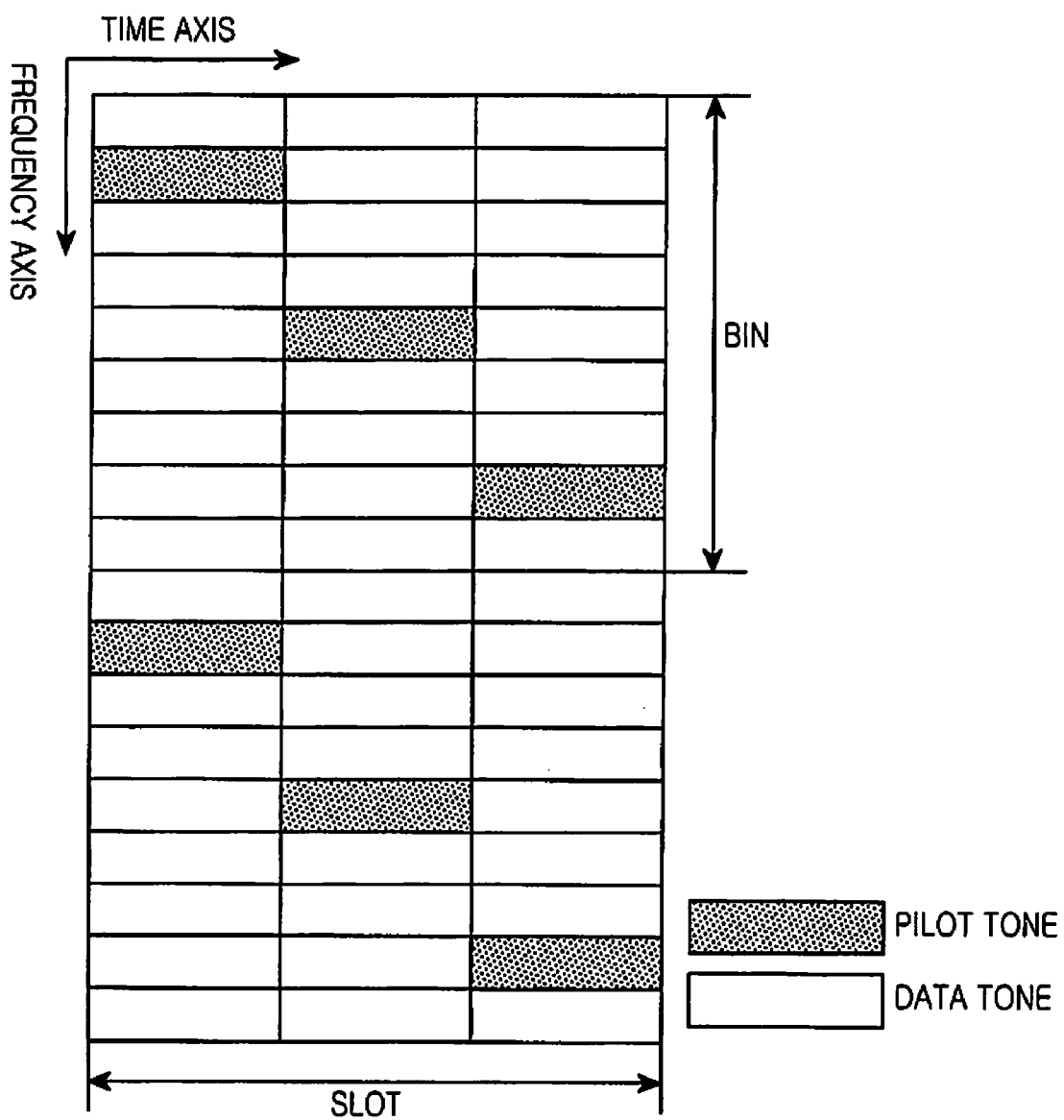
FIG. 4 is a diagram illustrating a B-AMC subchannel structure in the BWA system.

FIG. 4 is a diagram illustrating a Band-Adaptive Modulation and Coding (B-AMC) subchannel structure in a BWA system.

Referring to FIG. 4, one subchannel includes a total of 54 tones (or subcarriers) (i.e., 18 tones×3 symbols). The 54 tones are constituted by 48 data tones and 6 pilot tones. Each of the pilot tones has a predetermined location and is used to transmit a predetermined signal (e.g., a pilot signal) that is predetermined between a base station and a user terminal. For convenience in description, a pilot signal is assumed to have a value of '1'. The subchannel includes 18 tones on the frequency axis and 3 symbols on the time axis. Nine tones on the frequency axis are defined as a bin, while the 3 symbols on the time axis are defined as a slot.

Figure 5:
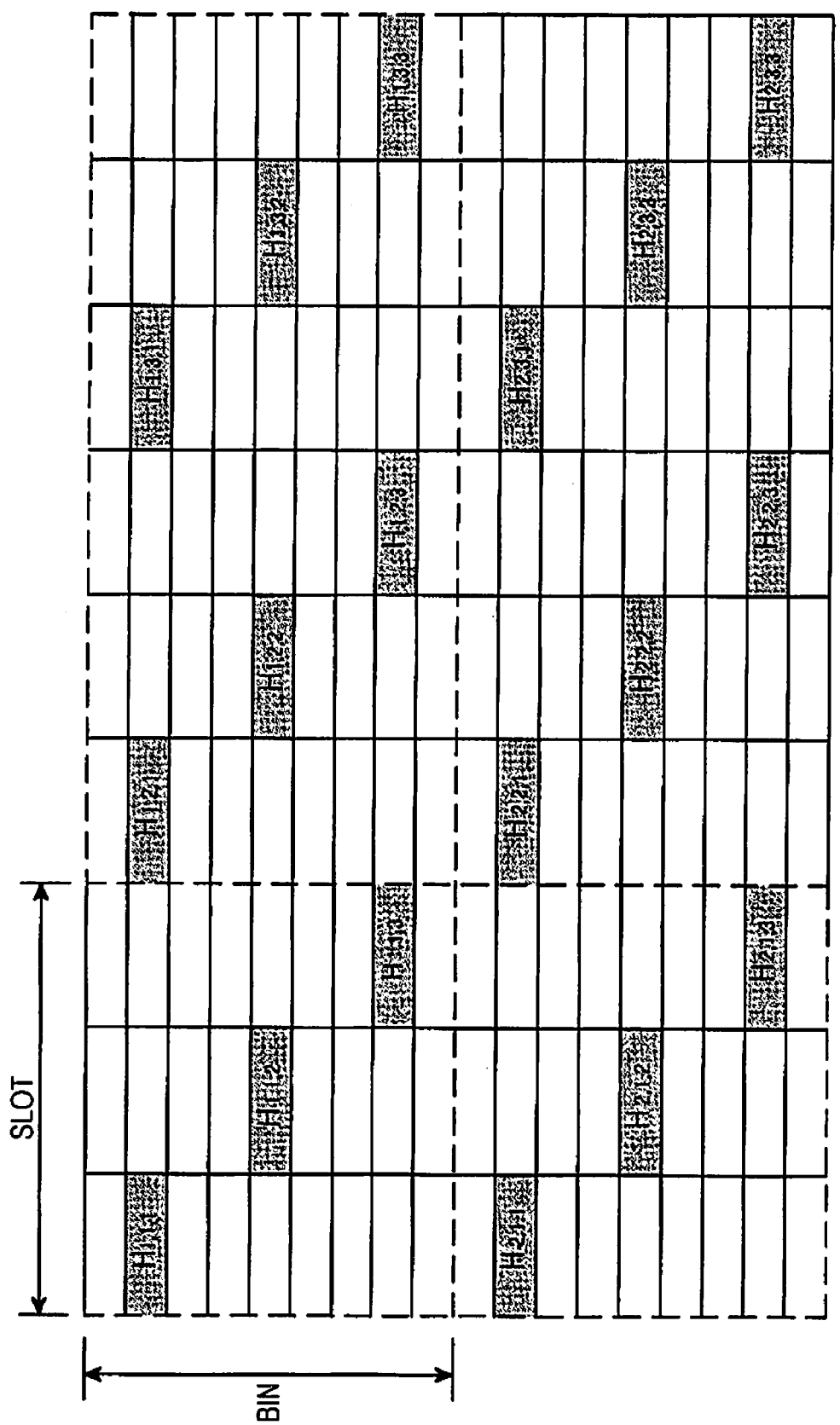
FIG. 5 is a diagram illustrating a 3-slot B-AMC subchannel structure in the BWA system.

In the case of a 3-slot frame structure, a subchannel continues for 3 slots on the time axis as illustrated in FIG. 5, i.e., in the case of a 3-slot B-AMC frame, tone values extracted by the subchannel extractor are stored in a two-dimensional fashion as illustrated in FIG. 5. In this case, an RX signal Y for each tone is an ($N_R$×1) column vector when a multiple RX antenna is used.

A description will be given of an interference eliminator for eliminating an inter-signal interference in the system using the subchannel structure illustrated in FIG. 5.

Figure 6:
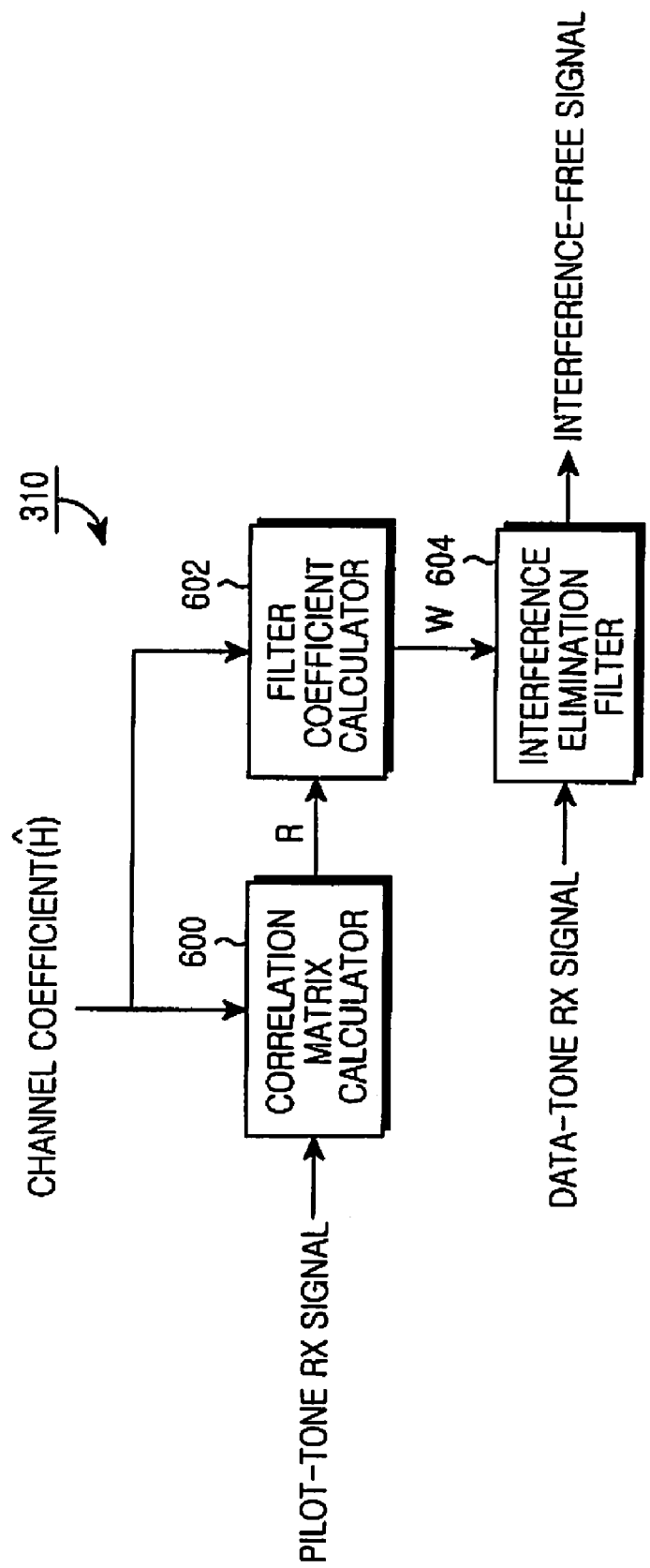
FIG. 6 is a block diagram of a MMSE interference eliminator according to an embodiment of the present invention.

FIG. 6 is a block diagram of an MMSE interference eliminator 310 according to an embodiment of the present invention.

Referring to FIG. 6, the MMSE interference eliminator 310 includes a correlation matrix calculator 600, a filter coefficient calculator 602, and an interference elimination filter 604.

Using a channel coefficient $\hat{H}_b$ from the channel estimator 308 and a pilot-tone RX signal $Y_{b,s,p}$ from the subchannel extractor 306, the correlation matrix calculator 600 calculates a correlation matrix R as Equation (4):

$$R = \frac{1}{18} \sum_{b=1}^{2} \sum_{s=1}^{3} \sum_{p=1}^{3} \left\{ (Y_{b,s,p} - \hat{H}_b)(Y_{b,s,p} - \hat{H}_b)^H \right\} \quad (4)$$

where indexes b, s and p are the same as those defined in Equation (3).

Unlike the general MMSE scheme, a desired signal is subtracted from the RX signal in Equation (4). Only nose/interference signals can be left by subtracting the desired signal from the RX signal, i.e., the convergence rate of the filter can be increased by calculating the average correlation of the noise/interference signals.

The filter coefficient calculator 602 calculates a filter coefficient using the correlation matrix R from the correlation matrix calculator 600 and the channel coefficient $\hat{H}_b$ from the channel estimator 308. The number of times the above calculation occurs may vary depending on the period of filter coefficients used. A total of 6 filter coefficients are calculated if filter coefficients are used for every slot and every bin in FIG. 5. Likewise, a total of 2 filter coefficients are calculated if filter coefficients are used for one out of every three slots and every bin in FIG. 5. In an embodiment of the present invention, it is assumed that the filter coefficients are calculated in the latter method in consideration of hardware computation complexity, the time-varying rate of a channel, and frequency selectivity. Therefore, a filter coefficient $W_b$ can be calculated as Equation (5):

$$W'_b = \hat{H}_b^H \cdot R^{-1}, b = 1, 2 \quad (5)$$
$$W_b = \frac{W'_b}{|W'_b \hat{H}_b|}$$

where b is a bin index and the second equation expresses the normalization of the filter coefficients.

Using the filter coefficient $W_b$ from the filter coefficient calculator 602, the interference elimination filter 604 eliminates an interference signal from an RX signal of the corresponding bin to output the resulting interference-free signal. This can be expressed as Equation (6):

$$\hat{x} = W_b Y \quad (6)$$

The CINR estimator 312 will now be described in more detail.

As described above, the CINR estimator 312 calculates a CINR (or noise power) using the filter coefficient W and the correlation matrix R received from the interference eliminator 310. Alternatively, the CINR estimator 312 estimates the noise power using the filter coefficient W and the channel coefficient H. The estimated noise power is used for LLR calculation.

The interference-free signal $\hat{x}$ in Equation (6) can be expressed as Equation (7):

$$\hat{x} = W_b Y = W_b H_d X_d + W_b (H_I X_I + N) \quad (7)$$

Based on Equation (7), the size of a signal C can be expressed as Equation (8):

$$C = E[\|W_b H_d X_d\|^2] = \|W_b H_d\|^2 = 1 \quad (8)$$

In Equation (8), the size of the signal becomes '1' because of the normalization in Equation (5).

Based on Equation (7), the size of interference I and noise N can be expressed as Equation (9):

$$IN = E[\|W_b (H_I X_I + N)\|^2] \approx W_b R W_b^H \quad (9)$$

where R denotes the correlation matrix calculated by the correlation matrix calculator 600 and W denotes filter coefficient calculated by the filter coefficient calculator 602.

Thus, based on Equation (8) and Equation (9), the CINR can be expressed simply as Equation (10):

$$CINR = \frac{C}{IN} = \frac{1}{W_b R W_b^H} \quad (10)$$

If the normalization of the filter coefficient is not performed in Equation (5), the CINR can be expressed as Equation (11):

$$CINR = \frac{C}{IN} = \frac{W'_b H_d (W'_b H_d)^H}{W'_b R W'^H_b} = \frac{W'_b H_d (W'_b H_d)^H}{H^H_d R^{-1} R W'^H_b} = W'_b H_d \qquad (11)$$

It can be seen from Equation (10) and Equation (11) that the CINR can be simply calculated using the channel coefficient H and the parameters W and R calculated by the MMSE interference eliminator.

Also, in the case of the general MMSE interference eliminator, the CINR can be similarly calculated using Equation (10) and Equation (11). In this case, a channel of an interference signal besides a channel $H_d$ of a desired RX user terminal must be estimated. The estimated channel of the interference signal is referred to as "$H_I$". When the number of RX antennas is $N_R$ and the number of interference signals is $N_{ICI}$, the channel $H_I$ of the interference signal has a size of $N_R \times N_{ICI}$.

Thus, when the general MMSE interference eliminator is used, the correlation matrix R according to Equation (10) can be expressed as Equation (12):

$$R = H_I H_I^H + \sigma^2 I \qquad (12)$$

where $\sigma^2$ denotes a thermal noise of a receiver and I denotes an ($N_R \times N_R$) identity matrix.

As described above, when the MMSE interference eliminator is used in the receiver, the present invention can simply calculate the CINR using the parameters calculated by the MMSE interference eliminator. The CINR may be calculated using Equation (10) or Equation (11) depending on whether the normalization of the filter coefficient is performed or not.

Figure 14:
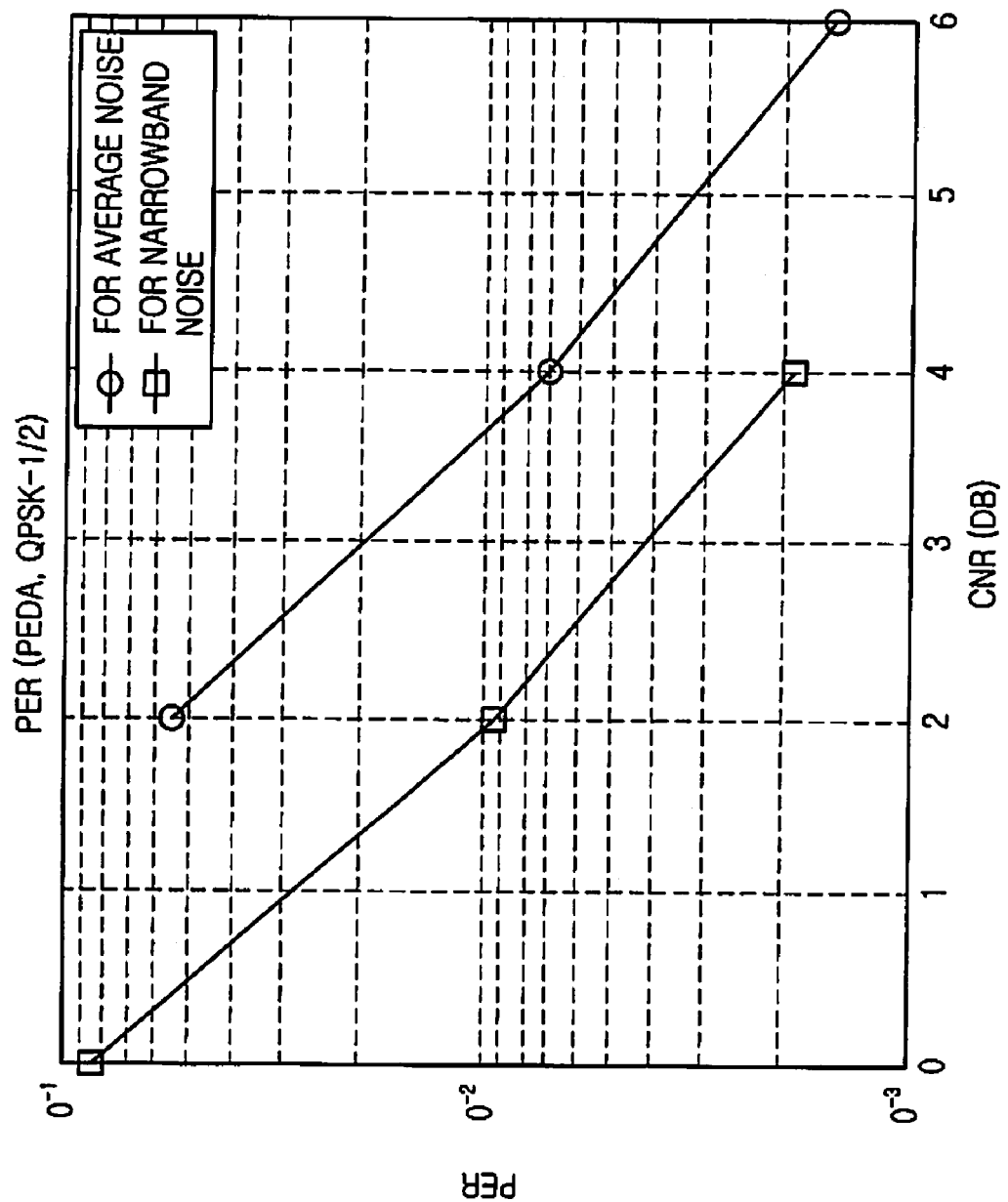
FIG. 14 is a graph illustrating a performance gain that is obtained when a narrowband noise (Carrier to Interference plus Noise Ratio (CINR)) according to the present invention is used.

FIG. 14 is a graph illustrating a performance gain that is obtained when the narrowband noise (CINR) according to the present invention is used. In the graph of FIG. 14, the axis of abscissas denotes a CINR and the axis of ordinates denotes a Packet Error Rate (PER).

It can be seen from the graph that, at the same RX strength (i.e., carrier to noise ratio (CNR)), the calculation of the LLR using the narrowband noise according to the present invention can provide a lower PER than the calculation of the LLR using the average noise.

Figure 7:
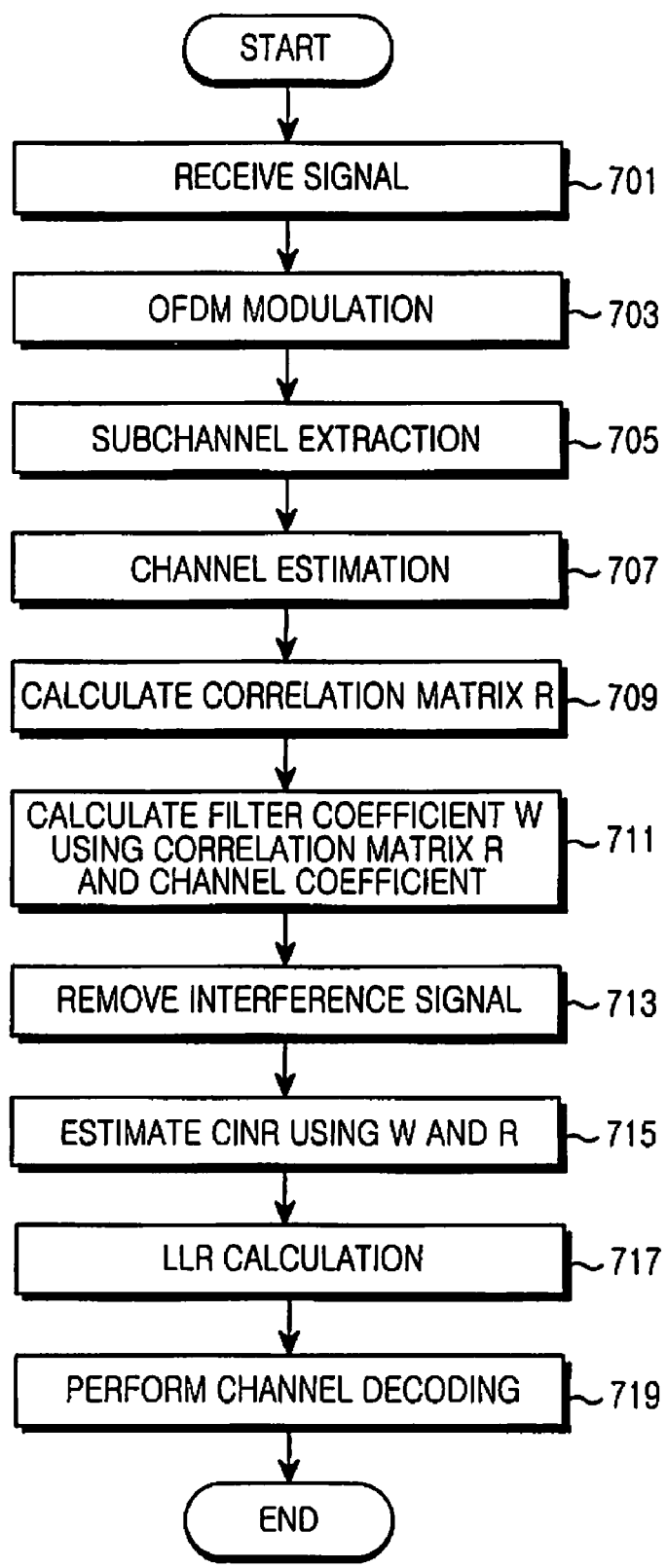
FIG. 7 is a flow diagram illustrating an operation of the receiver in the BWA system according to an embodiment of the present invention.

FIG. 7 is a flow diagram illustrating an operation of the receiver in the BWA system according to an embodiment of the present invention. The receiver may be a base station in the case of UL transmission, and a user terminal in the case of DL transmission.

Referring to FIG. 7, the receiver receives a signal through at least one antenna in step 701. The signal received through the antenna has the form of a desired signal plus interference/noise signals.

In step 703, the receiver converts the received RF signal into a baseband signal and OFDM-modulates the baseband signal to generate frequency-domain data. In step 705, the receiver discriminatively extracts a data signal and a pilot signal from the frequency-domain data in accordance with a subchannel structure used.

In step 707, the receiver estimates a channel coefficient $\hat{H}_b$ of the desired signal using the extracted pilot signal (or sounding signal). In step 709, the receiver subtracts the channel coefficient from a pilot-tone RX signal and autocorrelates the resulting signal to calculate a correlation matrix R. In step 711, the receiver calculates a coefficient W of the interference elimination filter using the correlation matrix R and the channel coefficient $\hat{H}_b$. In step 713, the receiver removes an interference signal from the Received (RX) signal using the calculated filter coefficient W.

In step 715, the receiver estimates a narrowband noise (CINR) using the correlation matrix R and the filter coefficient W. The CINR may be calculated using Equation (10) or Equation (11) depending on whether the filter coefficient is normalized.

In step 717, the receiver demodulates the resulting interference-free signal to generate LLRs, and applies a weight (reliability) corresponding to the CINR to the LLRs. In step 719, the receiver soft-decision decodes the LLRs to recover an information bit stream transmitted from a transmitter.

In general, a preamble signal for synchronization of a user terminal is located at the start of a DL frame in a BWA system and a DL/UL Mobile Application Part (MAP) follows the preamble signal. The MAP is information (e.g., the location of a data burst and a modulation level) representing UL/DL resource allocation. When the user terminal fails to demodulate the MAP information due to an inter-cell interference, etc, its connection with the system may be interrupted.

Figure 8:
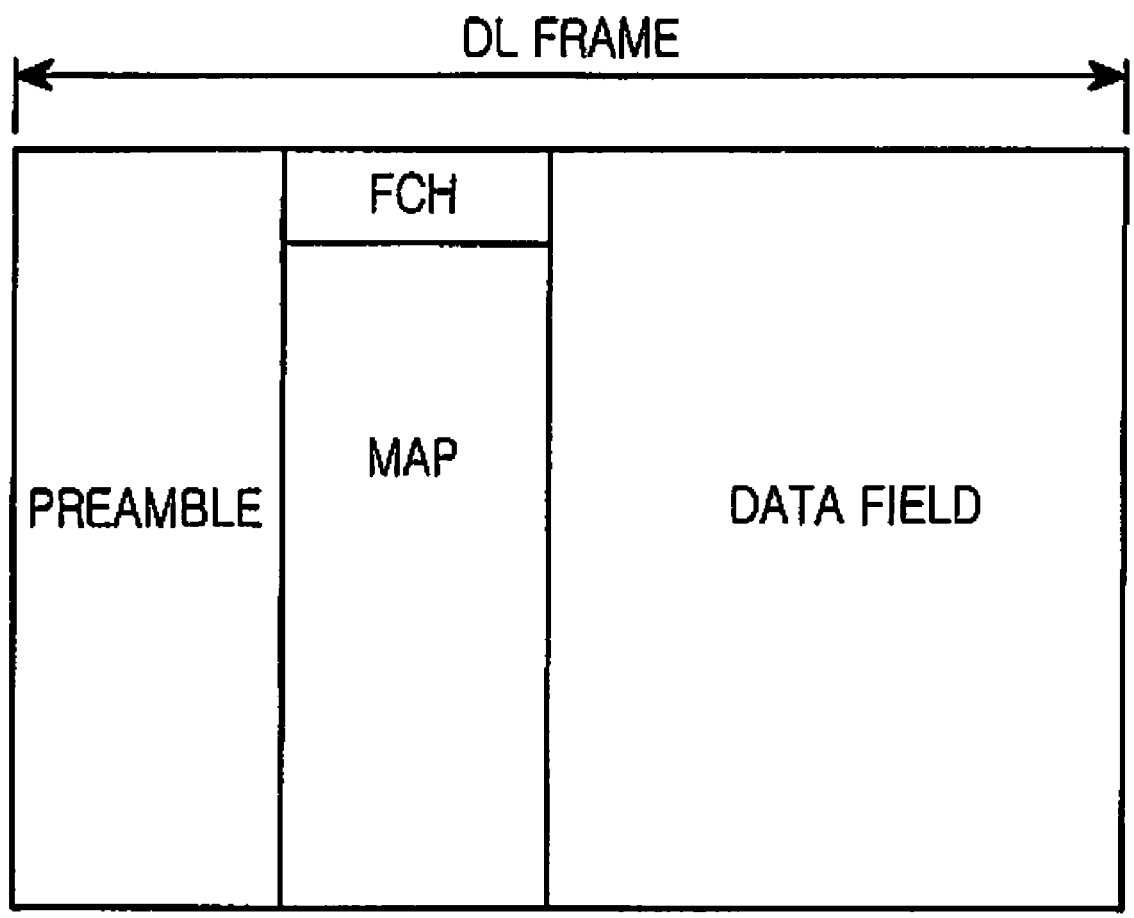
FIG. 8 is a diagram illustrating a DL frame structure in the BWA system according to an embodiment of the present invention.

FIG. 8 is a diagram illustrating a DL frame structure in the BWA system according to an embodiment of the present invention. In FIG. 8, the axis of abscissas denotes a time domain and the axis of ordinates denotes a frequency domain.

Referring to FIG. 8, the DL frame includes a preamble, a Frame Control Header (FCH), a DL MAP, an UL MAP, and a DL data field. The DL preamble is used for cell search and initial synchronization of a user terminal. The FCH includes information representing the basic structure of the frame. The DL MAP includes information indicating the field of DL data bursts. The UL MAP includes information indicating the structure of an UL frame.

The user terminal must demodulate the MAP information in the first half of DL frame in order to detect the location (or resource) of a data burst carrying an actual traffic. What is therefore required is an interference elimination technique for receiving the MAP information errorlessly in the environment of a multi-cell interference.

As described above, the coefficient W of the interference elimination filter is determined using channel information (or the channel coefficient). Hereinafter, a description will be given of a scheme for using the channel information of a preamble signal or the channel information of a pilot signal selectively depending on the location of information for the interference elimination technique.

Figure 9:
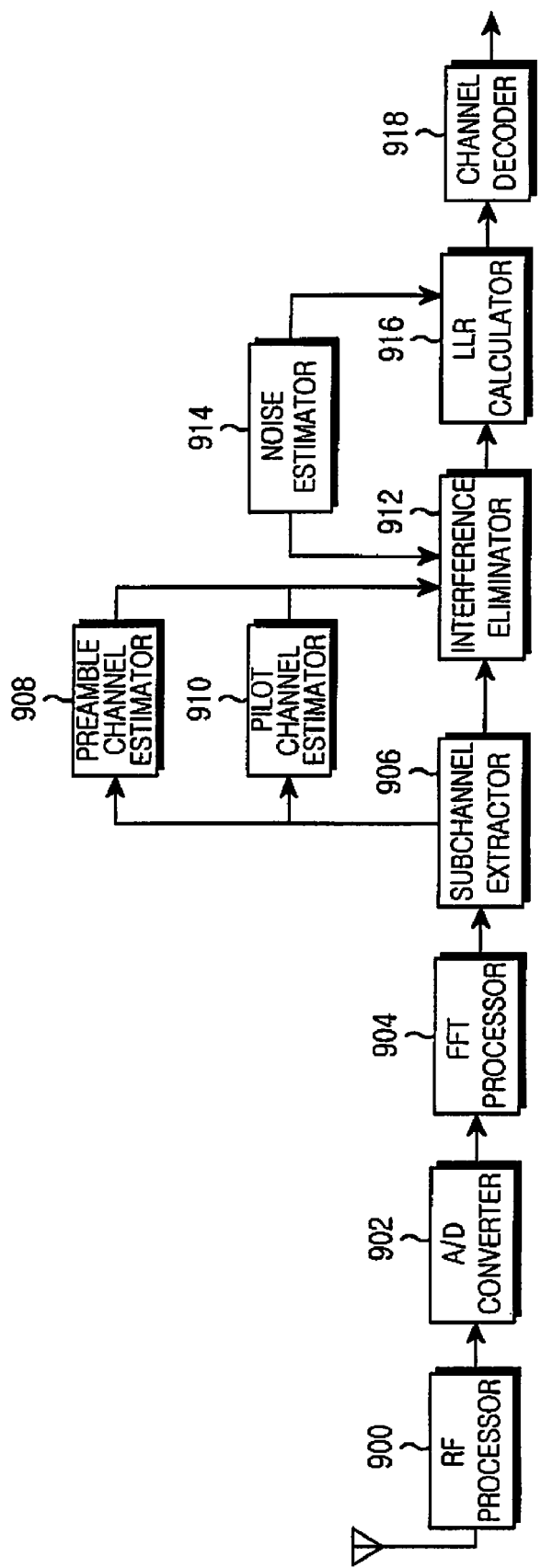
FIG. 9 is a block diagram of the receiver in the BWA system according to another embodiment of the present invention.

FIG. 9 is a block diagram of the receiver in the BWA system according to another embodiment of the present invention. Herein, the receiver is assumed to be a receiver of a user terminal.

Referring to FIG. 9, the receiver includes an RF processor 900, an A/D converter 902, an FFT processor 904, a subchannel extractor 906, a preamble channel estimator 908, a pilot channel estimator 910, an interference eliminator 912, a noise estimator 914, an LLR calculator 916, and a channel decoder 918. Although not illustrated in FIG. 9, the receiver is assumed to have multiple antennas.

The RF processor 900 includes a front-end unit and a filter. The RF processor 900 downconverts an RF signal received on a radio channel into a baseband signal. The A/D converter 902 converts the analog baseband signal received from the RF processor 900 into a digital signal (digital sample data).

The FFT processor 904 FFT-processes the time-domain sample data from the A/D converter 902 to output frequency-domain data. In the case of a preamble reception section, the subchannel extractor 906 extracts a preamble signal mapped at regular tone (or subcarrier) intervals, and provides the extracted preamble signal to the preamble channel estimator 908. In the case of a data reception section, in accordance with a subchannel structure used, the subchannel extractor 906 discriminatively extracts a data signal and a pilot signal from the frequency-domain data received from the FFT processor 904. In the case of a subchannel structure illustrated in FIG. 11, the subchannel extractor 906 extracts 4 pilot signals per given unit (14 tones×2 symbols) and provides them to the pilot channel estimator 910. The subchannel extractor 906 also provides the extracted data and pilot signals to the interference eliminator 912 discriminatively.

Figure 10:
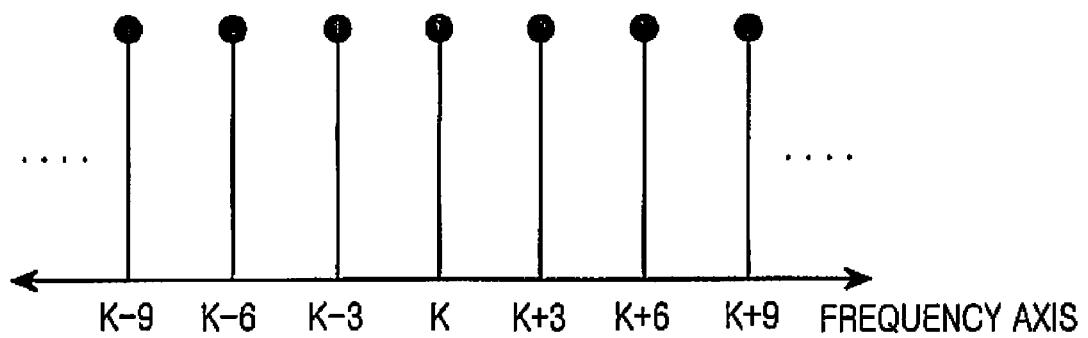
FIG. 10 is a diagram illustrating the frequency characteristics of a preamble.

The preamble channel estimator 908 estimates a channel coefficient of a serving base station using the preamble signal from the subchannel extractor 906. In general, a preamble signal is constituted by one OFDM symbol, and a signal is mapped at intervals of 3 subcarriers on the frequency axis as illustrated in FIG. 10. The signal mapped at intervals of 3 subcarriers is predetermined between a base station and a user terminal and is used for channel estimation in the user terminal.

There are a variety of channel estimation methods using the preamble signal. In an embodiment of the present invention, it is assumed that a simple linear interpolation technique is used for the channel estimation. A radio channel response (channel coefficient) corresponding to a subcarrier (i= . . . k−9, k−6, k−3, k, k+3, k+6 . . . ) with a preamble signal can be calculated by division by a predetermined signal $P_i$ as Equation (13):

$$\hat{H}_{PA,i} = \frac{Y_{PA,i}}{P_i}, \quad (13)$$
$$(i = \ldots k-9, k-6, k-3, k, k+3, k+6 \ldots)$$

where $Y_{PA}$ is an ($N_{ant}$×1) vector.

A channel coefficient for a subcarrier without a preamble signal is estimated using a linear interpolation technique. For example, the channel coefficients for the $(k+1)^{th}$ and $(k+2)^{th}$ indexes can be calculated as Equation (14):

$$\hat{H}_{PA,k+1} = \frac{(2\hat{H}_{PA,k} + \hat{H}_{PA,k+3})}{3} \quad (14)$$
$$\hat{H}_{PA,k+2} = \frac{(\hat{H}_{PA,k} + 2\hat{H}_{PA,k+3})}{3}$$

In this way, the preamble channel estimator 908 estimates the channel coefficients for all the subcarriers, averages the estimated channel coefficients, and provides the average channel coefficient $\hat{H}_{PA}$ to the interference eliminator 912. The estimated channel coefficient of the preamble signal is used to calculate the coefficient of the interference elimination filter in the subsequent process of eliminating an interference signal from an MAP signal. Since the MAP information is adjacent to the preamble, the coefficient of the interference elimination filter is calculated using the channel coefficient of a preamble providing accurate channel estimation, on the assumption that the radio channel response does not change greatly. Alternatively, the channel coefficient may be calculated using the channel coefficient of a pilot signal in the MAP section.

The pilot channel estimator 910 estimates a channel coefficient of the serving base station using the pilot signal from the subchannel extractor 906. There are a variety of channel estimation methods using the pilot signal. In an embodiment of the present invention, it is assumed that a simple linear interpolation technique is used for the channel estimation. A pilot-tone RX signal $Y_d$ is denoted by an ($N_{ant}$×1) vector. In the case of the subchannel structure illustrated in FIG. 11, a radio channel response for a subcarrier with a pilot signal can be calculated by division by a predetermined signal $P_i$ as Equation (15):

$$\hat{H}_{d,i} = \frac{Y_{d,i}}{P_i}, \quad (15)$$
$$(i = 1, 5, 9, 13)$$

where i denotes an index of the frequency axis.

Also, a channel coefficient for a subcarrier without a pilot signal is estimated using a linear interpolation technique.

In this way, the pilot channel estimator 910 estimates the channel coefficients for all the subcarriers, averages the estimated channel coefficients in units of slots, and provides the average channel coefficient $\hat{H}$, to the interference eliminator 912. The estimated channel coefficient of the pilot signal is used to calculate the coefficient of the interference elimination filter in a process of eliminating an interference signal from the corresponding data signal.

The interference eliminator 912 calculates a correlation matrix R using the channel coefficient $\hat{H}$ from the preamble channel estimator 908 or the pilot channel estimator 910, and then calculates the coefficient W of the interference elimination filter using the correlation matrix and the channel coefficient. The interference eliminator 912 sets the calculated coefficient in the interference elimination filter, and then filters the data signal from the subchannel extractor 906 using the interference elimination filter, thereby outputting the interference-free signal. The detailed structure of the interference eliminator 912 is the same as that in FIG. 6.

The noise estimator 914 calculates a CINR using the filter coefficient W and the channel coefficient. In another embodiment, the noise estimator 914 calculates a CINR using the filter coefficient W and the correlation matrix R. The calculated CINR is used as a weight for application of reliability to a demodulation signal for LLR calculation.

The LLR calculator 916 demodulates the interference-free signal from the interference eliminator 912 to generate an LLR, and applies a weight (reliability) of the CINR to the LLR. The channel decoder 918 soft-decision decodes the LLRs from the LLR calculator 916 to recover an information bit stream transmitted from a transmitter.

Figure 11:
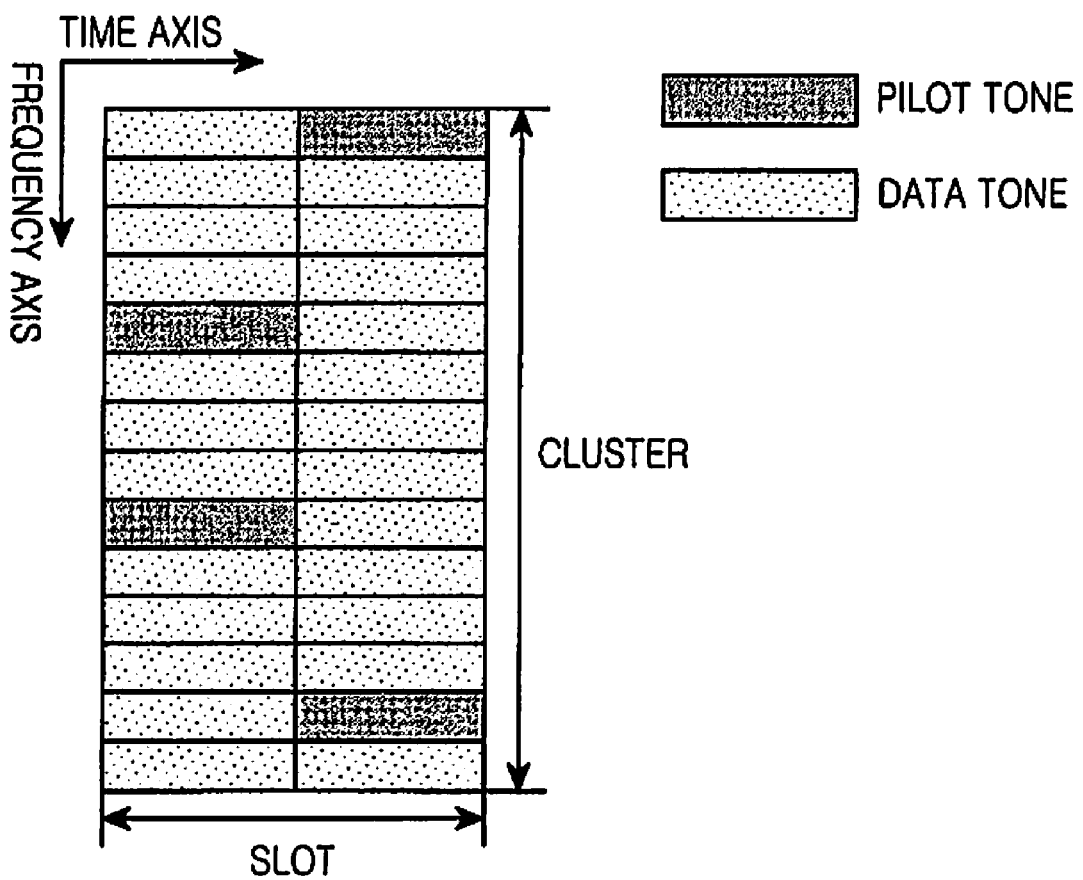
FIG. 11 is a diagram illustrating a PUSC subchannel structure in the BWA system according to the present invention.

FIG. 11 is a diagram illustrating a Partial Usage of Subcarrier (PUSC) subchannel structure in the BWA system according to the present invention.

Referring to FIG. 11, one subchannel includes a total of 28 tones (or subcarriers) (i.e., 14 tones×2 symbols). The 28 tones are constituted by 24 data tones and 4 pilot tones. Each of the pilot tones has a predetermined location and is used to transmit a predetermined signal (e.g., a pilot signal) that is predetermined between a base station and a user terminal. For convenience in description, the pilot signal is assumed to have a value of '1'. One cluster includes 14 tones on the frequency axis and 2 symbols on the time axis. The 2-symbol unit is defined as a slot.

In the case of a 2 or 3-slot frame structure, a subchannel continues for 2 or 3 slots on the time axis as illustrated in FIGS. 12A and 12B. In the case of a 2-slot B-PUSC frame, tone values extracted by the subchannel extractor are stored in a two-dimensional fashion as illustrated in FIG. 12A. In this case, an RX signal Y for each tone is an ($N_{ant} \times 1$) column vector, as described above.

A description will be given of the interference eliminator (see FIG. 6) for eliminating an inter-cell interference in the system using the subchannel structure illustrated in FIG. 11.

Referring to FIG. 6, the correlation matrix calculator 600 calculates a correlation matrix R using the channel coefficient H from the preamble channel estimator 908 or the pilot channel estimator 910 and the pilot-tone RX signal Y from the subchannel extractor 906 as Equation (16) and Equation (17) below. In the case of the elimination of an interference signal from a MAP signal, the channel coefficient is the preamble channel coefficient $\hat{H}_{PA}$. In the case of the elimination of an interference signal from a data signal of a data field, the channel coefficient is the pilot channel coefficient $\hat{H}_s$.

$$R = \frac{1}{N} \sum_{n=1}^{N} \{(Y_n - \hat{H}_{PA})(Y_n - \hat{H}_{PA})^H\} \quad (16)$$

where N denotes the number of pilot tones in the MAP signal.

$$R = \frac{1}{4Ns} \sum_{s=1}^{Ns} \sum_{p=1}^{4} \{(Y_{s,p} - \hat{H}_s)(Y_{s,p} - \hat{H}_s)^H\} \quad (17)$$

where s denotes a PUSC slot index and p denotes a pilot index in a cluster.

Unlike the general MMSE scheme, a desired signal is subtracted from the RX signal in Equation (16) and Equation (17). Only noise/interference signals can be left by subtracting the desired signal from the RX signal, i.e., the convergence rate of the filter can be increased by calculating the average correlation of the noise/interference signals.

The filter coefficient calculator 602 calculates a filter coefficient using the channel coefficient $\hat{H}$ from the preamble channel estimator 908 or the pilot channel estimator 910 and the correlation matrix R from the correlation matrix calculator 600. When the preamble channel coefficient is used, the above calculation has only to be performed only one time. On the other hand, when the pilot channel coefficient of the data field, the number of times of the above calculation may vary depending on the period of filter coefficients used. A total of 3 filter coefficients must be calculated if filter coefficients are used for every slot in FIG. 12B. The filter coefficient can be calculated as Equation (18):

$$W = \hat{H}^H \cdot R^{-1} \quad (18)$$

Using the filter coefficient W from the filter coefficient calculator 602, the interference elimination filter 604 eliminates an interference signal from an RX signal. This can be expressed as Equation (19):

$$\hat{x} = WY \quad (19)$$

Figure 13:
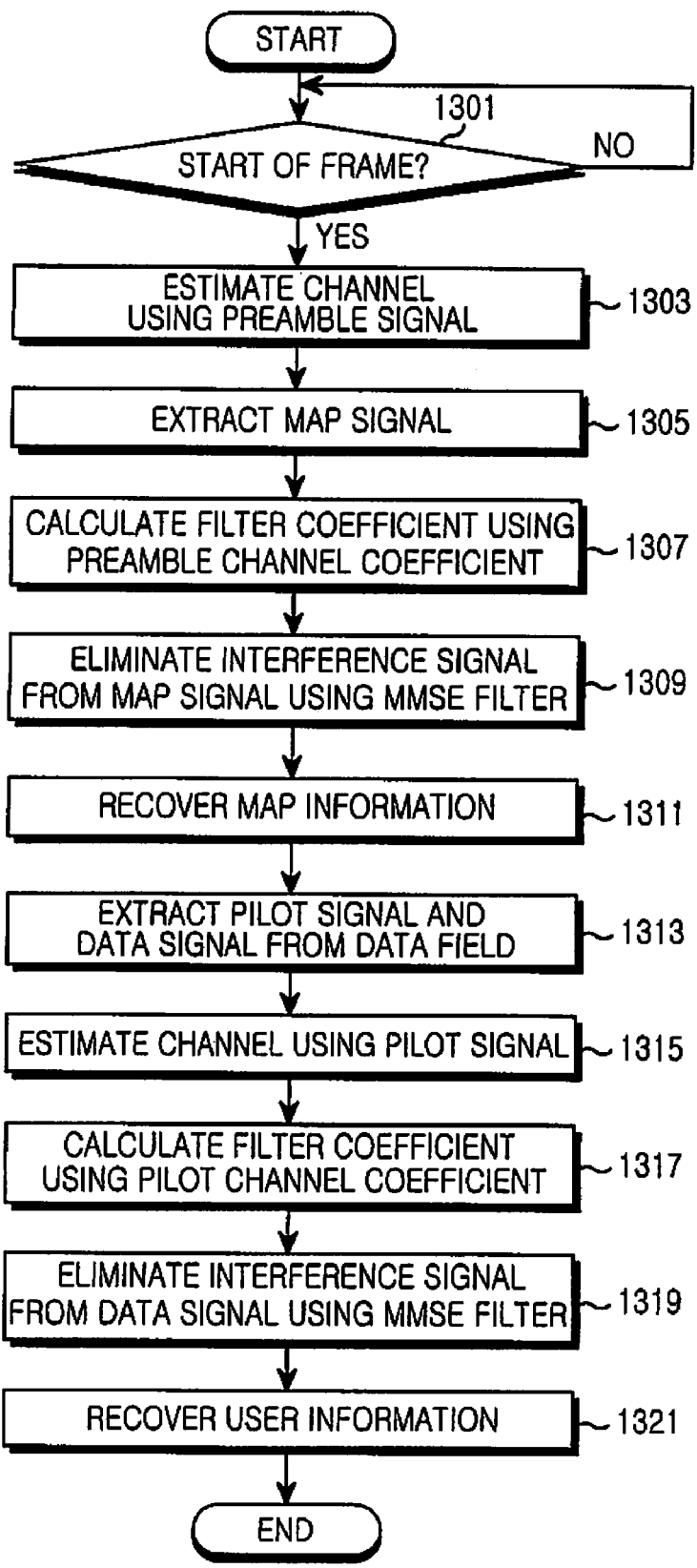
FIG. 13 is a flow diagram illustrating an operation of the receiver in the BWA system according to another embodiment of the present invention.

FIG. 13 is a flow diagram illustrating an operation of the receiver in the BWA system according to another embodiment of the present invention. Herein, the receiver is assumed to be a receiver of a user terminal.

Referring to FIG. 13, the receiver detects the start of a frame in a Received (RX) signal in step 1301. If the start of the frame is detected, the receiver estimates a channel using a preamble signal of the frame, in step 1303. For example, the receiver calculates a radio channel response for a subcarrier (pilot tone) with a preamble signal, and performs linear interpolation on the frequency axis to calculate a radio channel response for the entire frequency band. The receiver averages the radio channel responses for the entire frequency band to obtain a preamble channel coefficient $\hat{H}_{PA}$.

In step 1305, the receiver extracts a MAP signal next the preamble signal from the RX signal. That is, the receiver extracts a MAP signal from frequency-domain data that is OFDM-demodulated from the RX signal. In step 1307, the receiver calculates a correlation matrix R using the preamble channel coefficient and a predetermined-tone (pilot-tone) RX signal, and calculates an MMSE filter coefficient using the correlation matrix R and the preamble channel coefficient. In this case, the correlation matrix R may be calculated as Equation (16), and the MMSE filter coefficient W may be calculated as Equation (18).

In step 1309, the receiver eliminates an interference signal from the MAP signal using an MMSE filter with the calculated filter coefficient. In step 1311, the receiver demodulates and decodes the interference-free MAP signal to recover MAP information. The MAP information includes DL/UL resource allocation information.

In step 1313, the receiver discriminatively extracts a pilot signal and a data signal from an RX signal (an RX signal of the data field). The extracted pilot/data signal is a signal of a field (or resource) indicated by the MAP information. In step 1315, the receiver estimates a channel using the extracted pilot signal. For example, the receiver calculates a channel response for the extracted pilot signal, and performs linear interpolation on the frequency axis to calculate a channel response for a subcarrier (data tone) to which a pilot signal is not mapped. The receiver averages the responses in units of predetermined time periods (e.g., slots) to obtain a pilot channel coefficient.

In step 1317, the receiver calculates a correlation matrix R the pilot channel coefficient and a predetermined-tone (pilot-tone) RX signal, and calculates the MMSE filter coefficient W using the correlation matrix R and the pilot channel coefficient. In this case, the correlation matrix R may be calculated as Equation (17), and the MMSE filter coefficient W may be calculated as Equation (18).

In step 1319, the receiver eliminates an interference signal from the data signal using an MMSE filter with the calculated filter coefficient. In step 1321, the receiver demodulates and decodes the interference-free data signal to recover user information.

As described above, the present invention can remarkably reduce the calculation complexity in using the interference elimination technique, because there is no need to estimate the channel of an interference signal. Also, there is no need to know a pilot structure of another cell and to use a separate algorithm for determining the largest interference and the number of interferences. Also, there is no need to switch the demodulation algorithms depending on the presence or not of an interference signal, because the case of no interference is the same as that in an MRC (maximum ration combining) scheme. Also, the demodulation performance can be enhanced because the amount of narrowband residual interference can be effectively reflected in the LLR calculation. In particular, because the demodulation performance for important control information such as MAP can be enhanced, the disconnection from the system can be reduced. Consequently, the system capacity can be increased due to the above effects.

While the invention has been shown and described with reference to certain preferred embodiments thereof, it will be understood by those skilled in the art that various changes in form and details may be made therein without departing from the spirit and scope of the invention as defined by the appended claims. For example, the present invention can be similarly applied to other subchannel structures as well as the B-AMC subchannel structure and the PUSC subchannel structure. Also, a Signal-to-Noise Ratio (SNR) and a Signal-to-Interference plus Noise Ratio (SINR) may be used instead of the CINR.

What is claimed is:

1. A receiving apparatus in a wireless communication system, the receiving apparatus comprising:
   an estimator for estimating a desired signal;
   a first calculator for calculating a correlation matrix of a signal obtained by eliminating the estimated desired signal from a Received (RX) signal;
   a second calculator for performing an interference elimination using the correlation matrix; and
   a noise estimator for estimating a narrowband noise using at least one of the correlation matrix and a filter coefficient,
   wherein the second calculator comprises:
   a filter coefficient calculator for calculating the filter coefficient using a channel coefficient of the desired signal and the correlation matrix; and
   an interference elimination filter for eliminating an interference signal from a data-tone RX signal using the filter coefficient.

2. The receiving apparatus of claim 1, wherein the second calculator performs the interference elimination based on a Minimum Mean Square Error (MMSE) scheme.

3. The receiving apparatus of claim 1, wherein the estimator estimates an average channel coefficient of the desired signal.

4. The receiving apparatus of claim 1, wherein the received signal is a pilot-tone signal.

5. The receiving apparatus of claim 4, wherein the correlation matrix (R) is calculated as the following equation:

$$R = 1/N \Sigma_{n=1}^{N} \{(Y_n - \hat{H})(Y_n - \hat{H})^H\}$$

where N denotes a number of pilot tones in a transmission unit, $Y_n$ denotes a received signal of an $n^{th}$ pilot tone, above subscript small H denotes a Hermitian transpose and $\hat{H}$ denotes an average channel coefficient for the transmission unit.

6. The receiving apparatus of claim 5, wherein the transmission unit includes at least one tone and at least one Orthogonal Frequency Division Multiplexing (OFDM) symbol.

7. The receiving apparatus of claim 1, wherein the filter coefficient (W) is calculated as the following equation:

$$W = \hat{H}^H \cdot R^{-1}$$

where $\hat{H}$ denotes the channel coefficient of the desired signal, above subscript small H denotes a Hermitian transpose and R denotes the correlation matrix.

8. The receiving apparatus of claim 1, further comprising:
   a Log Likelihood Ratio (LLR) calculator for generating LLRs by demodulating an interference-free signal from the second calculator using the narrowband noise; and
   a decoder for recovering an information bit stream by decoding the LLRs from the LLR calculator.

9. The receiving apparatus of claim 1, wherein the narrowband noise (Carrier to Interference plus Noise Ratio (CINR)) is estimated as the following equation:

$$CINR = \frac{C}{IN} = \frac{1}{WRW^H}$$

where W denotes the filter coefficient, R denotes the correlation matrix, H denotes a Hermitian transpose, C denotes a power of the signal, I denotes a power of interference, and N denotes a power of noise.

10. The receiving apparatus of claim 1, wherein the narrowband noise (CINR) is estimated as the following equation:

$$CINR = \frac{C}{IN} = WH$$

where W denotes the filter coefficient, H denotes the channel coefficient of the desired signal, C denotes a power of the signal, I denotes a power of interference, and N denotes a power of noise.

11. The receiving apparatus of claim 1, further comprising:
   a preamble channel estimator for estimating a channel coefficient of a preamble signal;
   an extractor for extracting a control channel signal from a received signal;
   a third calculator for calculating a correlation matrix of a signal obtained by subtracting the channel coefficient of the preamble signal from a predetermined received signal in the control channel; and
   a fourth calculator for performing a Minimum Mean Square Error (MMSE)-based interference elimination on the control channel signal using the correlation matrix from the third calculator.

12. The receiving apparatus of claim 11, wherein the preamble channel estimator calculates an average channel coefficient of tones having a preamble signal.

13. The receiving apparatus of claim 11, wherein the control channel signal is a Mobile Application Part (MAP) signal that is received after the preamble signal.

14. The receiving apparatus of claim 11, wherein the predetermined received signal is a pilot-tone signal.

15. The receiving apparatus of claim 11, wherein the fourth calculator comprises:
   a filter coefficient calculator for calculating a filter coefficient using the channel coefficient of the preamble signal and the correlation matrix; and
   an interference elimination filter for eliminating an interference signal from the control channel signal using the filter coefficient.

16. The receiving apparatus of claim 15, wherein the filter coefficient (W) is calculated as the following equation:

$$W = \hat{H}^H \cdot R^{-1}$$

where $\hat{H}$ denotes the channel coefficient of the preamble signal, above subscript small H denotes a Hermitian transpose and R denotes the correlation matrix.

17. The receiving apparatus of claim 11, wherein the third calculator calculates the correlation matrix (R) as the following equation:

$$R = \frac{1}{N}\sum_{n=1}^{N}\{(Y_n - \hat{H}_{PA})(Y_n - \hat{H}_{PA})^H\}$$

where N denotes the number of pilot tones in the control channel signal, $Y_n$ denotes a received signal of the $n^{th}$ pilot tone in the control channel, above subscript small H denotes a Hermitian transpose and $\hat{H}_{PA}$ denotes the channel coefficient of the preamble signal.

18. A receiving apparatus in a wireless communication system, the receiving apparatus comprising:
    a first channel estimator for estimating a channel coefficient of a preamble signal;
    a second channel estimator for estimating a channel coefficient of a pilot signal received in a data field;
    an interference eliminator for calculating a correlation matrix by autocorrelating a signal obtained by subtracting the channel coefficient of the preamble signal or the channel coefficient of the pilot signal from a predetermined tone of a received signal, and performing a Minimum Mean Square Error (MMSE) based interference elimination on a data-tone received signal using the calculated correlation matrix;
    a noise estimator for estimating a narrowband noise using a filter coefficient of the interference eliminator, wherein the filter coefficient is calculated by the channel coefficient from the first channel estimator or the channel coefficient from the second channel estimator and the correlation matrix; and
    a Log Likelihood Ratio (LLR) calculator for generating LLRs by demodulating an interference-free signal from the interference eliminator using the narrowband noise.

19. The receiving apparatus of claim 18, wherein if the data-tone received signal is a control channel signal, the interference eliminator calculates the correlation matrix using the channel coefficient of the preamble signal; and if the data-tone received signal is a data field signal, the interference eliminator calculates the correlation matrix using the channel coefficient of the pilot signal.

20. The receiving apparatus of claim 18, wherein the correlation matrix (R) is calculated as the following equation:

$$R = \frac{1}{N}\sum_{n=1}^{N}\{(Y_n - \hat{H})(Y_n - \hat{H})^H\}$$

where N denotes a number of pilot tones in a field to be demodulated, $Y_n$ denotes a received signal of an $n^{th}$ pilot tone, above subscript small H denotes a Hermitian transpose and $\hat{H}$ denotes a channel coefficient.

21. The receiving apparatus of claim 18, wherein the narrowband noise (Carrier to Interference plus Noise Ratio (CINR)) is estimated as the following equation:

$$CINR = \frac{C}{IN} = WH$$

where W denotes a coefficient of an MMSE filter, H denotes a channel coefficient, C denotes a power of the signal, I denotes a power of interference, and N denotes a power of noise.

22. A receiving method in a wireless communication system, the receiving method comprising the steps of:
    estimating a desired signal;
    calculating a first correlation matrix of a signal obtained by eliminating the estimated desired signal from a received signal; and
    performing an interference elimination using the first correlation matrix; and
    estimating a narrowband noise using the first correlation matrix and a filter coefficient,
    wherein the interference elimination comprises:
    calculating the filter coefficient using a channel coefficient of the desired signal and the first correlation matrix; and
    eliminating an interference signal from a data-tone Received (RX) signal using the filter coefficient.

23. The receiving method of claim 22, wherein the interference elimination is performed based on a Minimum Mean Square Error (MMSE) scheme.

24. The receiving method of claim 22, wherein the estimation estimates an average channel coefficient of the desired signal.

25. The receiving method of claim 22, wherein the received signal is a pilot-tone signal.

26. The receiving method of claim 22, wherein the first correlation matrix (R) is calculated as the following equation:

$$R = \frac{1}{N}\sum_{n=1}^{N}\{(Y_n - \hat{H})(Y_n - \hat{H})^H\}$$

where N denotes the number of pilot tones in a transmission unit, $Y_n$ denotes a received signal of the $n^{th}$ pilot tone, above subscript small H denotes a Hermitian transpose and $\hat{H}$ denotes an average channel coefficient for the transmission unit.

27. The receiving method of claim 22, wherein the transmission unit includes at least one tone and at least one OFDM symbol.

28. The receiving method of claim 22, wherein the filter coefficient (W) is calculated as the following equation:

$$W = \hat{H}^H \cdot R^{-1}$$

where $\hat{H}$ denotes the channel coefficient of the desired signal, above subscript small H denotes a Hermitian transpose and R denotes the first correlation matrix.

29. The receiving method of claim 22, further comprising the steps of:
    generating Log Likelihood Ratios (LLRs) by demodulating an interference-free signal resulting from the interference elimination using the narrowband noise; and
    recovering an information bit stream by decoding the generated LLRs.

30. The receiving method of claim 22, wherein the narrowband noise (Carrier to Interference plus Noise Ratio (CINR)) is estimated as the following equation:

$$CINR = \frac{C}{IN} = \frac{1}{WRW^H}$$

where W denotes the filter coefficient, R denotes the first correlation matrix, and H denotes a Hermitian transpose, C denotes a power of the signal, I denotes a power of interference, and N denotes a power of noise.

31. The receiving method of claim 22, wherein the narrowband noise (CINR) is estimated as the following equation:

$$CINR = \frac{C}{IN} = WH$$

where W denotes the filter coefficient and H denotes the channel coefficient of the desired signal, C denotes a power of the signal, I denotes a power of interference, and N denotes a power of noise.

32. The receiving method of claim 22, further comprising:
estimating a channel coefficient of a preamble signal;
extracting a control channel signal from a received signal;
calculating a second correlation matrix of a signal obtained by subtracting the channel coefficient of the preamble signal from a predetermined received signal in the control channel; and
performing a Minimum Mean Square Error (MMSE)-based interference elimination on the control channel signal using the second calculated correlation matrix.

33. The receiving method of claim 32, wherein the preamble channel estimation further comprises calculating an average channel coefficient of tones having a preamble signal.

34. The receiving method of claim 32, wherein the control channel signal is a MAP signal that is received after the preamble signal.

35. The receiving method of claim 32, wherein the predetermined received signal is a pilot-tone signal.

36. The receiving method of claim 32, wherein the interference elimination comprises:
calculating a filter coefficient using the channel coefficient of the preamble signal and the second correlation matrix; and
eliminating an interference signal from the control channel signal using the filter coefficient.

37. The receiving method of claim 36, wherein the filter coefficient (W) is calculated as the following equation:

$$W = \hat{H}^H \cdot R^{-1}$$

where $\hat{H}$ denotes the channel coefficient of the preamble signal, above subscript small H denotes a Hermitian transpose and R denotes the second correlation matrix.

38. The receiving method of claim 32, wherein the second correlation matrix (R) is calculated as the following equation:

$$R = \frac{1}{N} \sum_{n=1}^{N} \left\{ (Y_n - \hat{H}_{PA})(Y_n - \hat{H}_{PA})^H \right\}$$

where N denotes the number of pilot tones in the control channel signal, $Y_n$ denotes a received signal of the $n^{th}$ pilot tone in the control channel, above subscript small H denotes a Hermitian transpose and $\hat{H}_{PA}$ denotes the channel coefficient of the preamble signal.

39. A receiving method in a wireless communication system, the receiving method comprising the steps of:
estimating a channel coefficient of a preamble signal;
estimating a channel coefficient of a pilot signal received in a data field;
calculating a correlation matrix by autocorrelating a signal obtained by subtracting the channel coefficient of the preamble signal or the channel coefficient of the pilot signal from a predetermined tone of a received signal;
performing an Minimum Mean Square Error (MMSE)-based interference elimination on a data-tone received signal using the calculated correlation matrix;
estimating a narrowband noise using a coefficient of an MMSE-based interference elimination, wherein the filter coefficient is calculated by the channel coefficient from the first channel estimator or the channel coefficient from the second channel estimator and the correlation matrix; and
generating Log Likelihood Ratios (LLRs) by demodulating an interference-free signal resulting from the interference elimination step using the narrowband noise.

40. The receiving method of claim 39, wherein the correlation matrix (R) is calculated as the following equation:

$$R = \frac{1}{N} \sum_{n=1}^{N} \left\{ (Y_n - \hat{H})(Y_n - \hat{H})^H \right\}$$

where N denotes the number of pilot tones in a field to be demodulated, $Y_n$ denotes a received signal of the $n^{th}$ pilot tone, above subscript small H denotes a Hermitian transpose and $\hat{H}$ denotes a channel coefficient.

41. The receiving method of claim 39, wherein the narrowband noise (CINR) is estimated as the following equation:

$$CINR = \frac{C}{IN} = WH$$

where W denotes a coefficient of an MMSE filter and H denotes a channel coefficient, C denotes a power of the signal, I denotes a power of interference, and N denotes a power of noise.

42. The receiving method of claim 39, wherein
if the data-tone received signal is a control channel signal, the correlation matrix is calculated using the channel coefficient of the preamble signal; and if the data-tone received signal is a data field signal, the correlation matrix is calculated using the channel coefficient of the pilot signal.

\* \* \* \* \*